United States Patent Office 3,428,451

Patented Feb. 18, 1969

3,428,451

SUPPORTS FOR RADIATION-SENSITIVE ELEMENTS AND IMPROVED ELEMENTS COMPRISING SUCH SUPPORTS

Donald J. Trevoy, Rochester, N.Y., assignor to Eastman Kodak Company, Rochester, N.Y., a corporation of New Jersey

No Drawing. Continuation-in-part of application Ser. No. 361,229, Apr. 20, 1964, which is a continuation-in-part of application Ser. No. 56,648, Sept. 19, 1960. This application Mar. 21, 1966, Ser. No. 435,699

The portion of the term of the patent subsequent to Apr. 12, 1983, has been disclaimed and dedicated to the public

U.S. Cl. 96—1 12 Claims

Int. Cl. G03g *5/08*

ABSTRACT OF THE DISCLOSURE

Radiation sensitive recording elements comprising a conductive layer, e.g. a layer having cuprous iodide or other semiconductor compound dispersed in resin binder, and a recording layer, e.g. silver halide or photoconductive composition, is improved by presence of a water-impermeable dielectric resin barrier layer separating the sensitive layer from the conductive layer.

This invention relates to improved electrically conductive supports for radiation-sensitive recording elements and to improved radiation-sensitive recording elements embodying such supports. This application in a continuation-in-part of U.S. patent application Ser. No. 361,229, now U.S. Patent 3,245,833 issued Apr. 12, 1966, by Donald J. Trevoy which is a continuation-in-part of U.S. patent application Ser. No. 56,648 filed Sept. 19, 1960, now abandoned.

In the parent application, I described and claimed improved supports for radiation-sensitive elements comprising an improved electrically conducting layer comprising a semiconductor compound, or a complex of such semiconductor compound, dispersed in a film-forming vehicle.

In accordance with the present invention I have found that in radiation-sensitive elements which comprise a support having thereon an electrically conductive layer, it is advantageous to provide, on the support, a barrier layer consisting of a dielectric, water-impermeable film over the electrically conductive layer. In certain preferred embodiments, this dielectric, water-impermeable barrier layer separates the electrically conductive layer from the electron-sensitive layer of the element.

In certain preferred embodiments of my invention, the barrier layer serves to protect the radiation-sensitive coating from effects adverse to photographic sensitivity caused by migration of materials between the electrically conductive layer and the radiation-sensitive layer. In some embodiments, the barrier layer serves to protect the electrically conductive layer from adverse effects of processing liquids applied in use of the sensitive element to the surface of the sensitive element. In other embodiments, as in embodiments in which the sensitive layer is a photoconductive insulating layer, the barrier layer improves electrical properties of the radiation-sensitive layer. In other embodiments, the barrier layer, over an antistatic backing layer, prevents contact of the conductive layer with the sensitive layer when the film is wound in reels or spools.

Supports comprising a sheet with an electrically conductive layer are useful for making various types of radiation-sensitive elements, as examples: sheet supports for silver halide emulsions in photosensitive or X-ray sensitive or electron-beam-sensitive elements; supports for photoconductive insulating coatings of various kinds used in electrophotography, etc. Conductive supports comprising a sheet with an electrically conductive coated layer of the kind described in the parent application, now U.S. Patent 3,245,833 issued Apr. 12, 1966, are particularly useful for making such radiation-sensitive elements. The barrier layer of the present invention, incorporated in such elements between the electrically conductive coating and the radiation-sensitive layer provides, in some embodiments, substantial improvement in the radiation-sensitive or electrical properties of the element in which such layer is incorporated and in some embodiments improves stability of the sensitive layer. In preferred embodiments of my invention I use, as a barrier layer over the conductive coating, a coated layer of a resin which forms a film having the requisite properties of high electrical resistivity and water impermeability.

The following examples embodying the invention describe in detail an illustrative manner of making and using certain preferred embodiments of the present invention.

Example 1

Cuprous iodide (2.4 g.) was dissolved in a mixture of 200 ml. methylethylketone and 4.0 ml. of trimethyl phosphite, then 40 ml. of a 5% solution of a terpolymer, poly(methylacrylate-vinylidene-chloride-itaconic acid) in 90% methylethyl ketone and 10% cyclohexanone, was added. The filtered solution was machine-coated by bead application on a subbed polyester film support to give a coverage of 5 mg. of copper per square foot. The coating was dried at 110° C. and then cured at 120° C. for 10 minutes. The coating was clear and surface resistivity was $1.7 \times 10^5$ ohms per square. A protective layer of Vinylite VMCH was solution-coated from a ketone solvent over the conducting layer. This protective coating was dried at 95° C. and cured at 100° C. for 4 minutes. This layer serves as a barrier between the cuprous iodide layer and the silver halide photographic emulsion layer. Over the protective layer a thin subbing of cellulose nitrate (from a 1.4% solution in methanol) was applied as a sub to improve adhesion. A gelatin subbing layer and a gelatin-silver halide photographic emulsion of the Lippman type was coated over this subbing layer. Despite the fact that the conducting coating was covered by four layers of insulating material, surface resistivity at the outer surface was still considerably less than $10^{11}$ o.p.s. Without the conductive coating, surface resistivity on the outer coated surface would be more than $10^{11}$ ohms per square. This film is especially suitable for direct electron recording, which is usually done in vacuum. An example, of such use is as a recording film in an electron microscope. Low surface resistivity prevents accumulation of electrons and consequent image distortion during electron beam exposure. A polyester film support (e.g. Mylar) is preferred for direct electron recording because of its exceptional stability in vacuum. In making films for use in vacuum it is advantageous to thoroughly remove solvents from each successive coating. Residual volatile material can cause film damage when the film is used in vacuum.

Example 2

A polyester support subbed with a terpolymer of methyl acrylate-vinylidene chloride-itaconic acid, was coated as in Example 1 with a conducting layer containing cuprous iodide dispersed in a terpolymer binder having the same composition as the subbing terpolymer. Over the cured conducting layer a gelatin sub containing hardener was applied from a solution of methanol and water. To the dried gelatin layer was applied a barrier layer of a terpolymer of acrylonitrile-vinylidene chloride-acrylic acid from a solution containing 4.5 g. of the terpolymer in an organic solvent comprising predominantly methyl ethyl ketone. The purpose of the intermediate gelatin layer was to prevent damage to the conducting layer by ketone solvents in the barrier layer solution. After curing with heat, the thickness of the barrier layer was typically in the range 0.5–1.5 microns. Above the barrier layer was coated another gelatin sub from an aqueous solution to improve adhesion of emulsion, and finally an electron-sensitive emulsion was coated over the gelatin sub layer. Resistivity of the coated support, when measured by an A.C. method at 2000 cycles per second, was $3\times10^5$ ohms per square, and adhesion of all layers was satisfactory. Photoprocessing of the exposed emulsion, using a normal immersion processing cycle, produced no change in the conductivity of the film. The emulsion did not show adverse sensitometric changes when subjected to accelerated keeping tests at elevated temperature and humidity. On exposure by electrons, the conducting layer served to eliminate undesirable spreading of the exposing beam of electrons. Such spreading of the electron beam occurred, particularly at high beam currents, when no conducting layer was employed.

Example 3

A polyester support subbed with a terpolymer of methyl acrylate-vinylidene chloride-itaconic acid, was coated as in Example 1 with a conducting layer containing cuprous iodide dispersed in a terpolymer binder having the same composition as the subbing terpolymer. Over the cured conducting layer a barrier layer of the same terpolymer composition (methylacrylate-vinylidene chloride-itaconic acid) was coated as a latex dispersion in water. During curing with heat the latex polymer formed a continuous, water-impermeable coating which had a dry thickness of the order of 1 micron. To guard against the possibility of pinholes in the barrier layer, a second identical barrier layer of the same terpolymer was applied over the first from a latex dispersion. Above the second barrier layer a gelatin sub was applied from an aqueous solution, and finally an electron sensitive silver halide-gelatin emulsion was coated over the gelatin sub layer. Resistivity of the coated support, when measured by an A.C. method at 2000 cycles per second, was $5\times10^5$ ohms per square, and adhesion of all layers was satisfactory. Photoprocessing of the exposed emulsion, using a normal immersion processing cycle, produced no change in the conductivity of the film. The emulsion did not show adverse sensitometric changes when subjected to accelerated keeping tests at elevated temperature and humidity. On exposure by electrons, the conducting layer served to eliminate undesirable spreading of the exposing beam of electrons.

Example 4

As in Example 2, subbed polyester support was coated in sequence with conducting layer, gelatin sub, barrier layer, and gelatin sub. Over the second gelatin sub was applied a photosensitive silver halide-gelatin emulsion. Resistivity of the coated support, when measured by an A.C. method at 2000 cycles per second, was $3\times10^5$ ohms per square, and adhesion of all layers was satisfactory. Photoprocessing of the exposed emulsion, using a conventional immersion processing cycle, produced no change in the conductivity of the film. The emulsion did not show adverse sensitometric changes when subjected to accelerated keeping tests at elevated temperature and humidity. The conducting coating served as an effective antistat for the film.

Example 5

As in Example 3, subbed polyester support was coated in sequence with conducting layer, two layers of barrier polymer, and gelatin sub. Over the gelatin sub was applied a photosensitive silver halide-gelatin emulsion. Resistivity of the coated support, when measured by an A.C. method at 2000 cycles per second, was $5\times10^5$ ohms per square, and adhesion of all layers was satisfactory. Photoprocessing of the exposed emulsion, using a normal immersion processing cycle, produced no change in the conductivity of the film. The emulsion did not show adverse sensitometric changes when subjected to accelerated keeping tests at elevated temperature and humidity. The conducting coating served as an effective antistat for the film.

Example 6

A poly(ethylene terephthalate) sheet coated with a sub of a resin terpolymer of (methyl acrylate, vinylidene chloride, itaconic acid) was coated with a conductive layer containing cuprous iodide, the same as that described in Example 1. After the conductive had been cured, a barrier layer of cellulose nitrate, about 1.5 microns dry thickness, was coated from methanol solution. This layer was dried to remove solvent. A conventional thin gelatin sub was applied over the cellulose nitrate to promote adhesion, then an organic photoconductive insulating coating was coated over the gel sub as follows. A coating solution was prepared containing 6. g. of triphenylamine, 14 g. of Vitel PE–101X resin, 0.037 g. of Crystal Violet, and 70 ml. of propylene chloride. This solution was then applied over the gel sub using a coating knife set at 0.003-inch on a coating block heated to 130° F. Control coatings of the same solution were also coated on an aluminum foil. After drying for 10 minutes, the coatings were dark adapted at 50° C. for 20 hours. Under negative corona of 9 kv., the photoconductive layer readily accepted a charge more than 800 volts. The charge capacity, dark decay, and photodecay were virtually identical for the sample having a cuprous iodide layer with barrier layer on polyester support, coated as above, and for the samples of organic photoconductor coated on aluminum foil. Xerographic images were produced using both kinds of samples by exposure to 60 foot candles of light followed by cascade development, heat fixation, etc. With the barrier layer between the conductive layer and photosensitive layer, as in the test sample described above, the photoconductive element will accept either a positive or a negative charge. Without the barrier layer, the difficulty has arisen that the photoconductive insulating coating will hold a positive charge but will not hold a negative charge. Since most of the conventional electrophotographic equipment and toners in commercial use are adapted for use of negative corona charging, the combination comprising a barrier layer between the photoconductive insulating layer and the electrically conductive layer provides a photoconductive element more readily adaptable to these conventional processes.

In the above examples, we have described specific embodiments of the invention using preferred electrically conductive coatings of the kind more particularly described in the parent application, now U.S. Patent 3,245,833 issued Apr. 12, 1966; namely, those comprising a dispersed semiconductor compound in a resin vehicle. In broader terms I envision my invention as a support having a water-impermeable, electrically insulating barrier layer over a conducting layer which may be of various other kinds as a support for various kinds of radiation-sensitive layers. For example, in various elements embodying my invention, I may employ as a conducting layer a vacuum-evaporation deposited layer of cuprous iodide, or I may employ a conducting layer containing an organic semiconductor, or I may employ a conducting layer of metal foil or other suitable electrically conducting layers on a suitable support with a barrier layer over the conducting layer.

A preferred method of making such conductive coatings is by coating a solution containing the semiconductor compound and the binder, both solubilized in a volatile solvent which evaporates leaving film of the binder material with a dispersion of the semiconductor in the binder.

A complexing agent is used to solubilize the ordinarily insoluble semiconductor compound.

From consideration of prior art coatings which comprise an insulating layer of semiconductor material dispersed in film-forming binders (i.e., silver halide-gelatin photographic emulsions, photoconductive insulating layers in electrophotographic elements, etc.) the very good conductivity of my conductive layers would not be expected. The reason for this good conductivity is not entirely understood but I believe it is related to the extremely fine and homogeneous dispersion of semiconducting material obtained by the solution coating method, which perhaps forms a conducting lattice in the binder film as the coated solution is dried.

In various embodiments of the invention, conductive coatings will contain semiconductor compounds in concentrations ranging from as low as about 15% by volume of the finished coating up to about 80–90% by volume. Volume percentages, as expressed, are calculated from known densities of the respective semiconductor and binder components and from known weight ratios of these materials in the coating.

The minimum volume percentage needed to provide the necessary conductivity will vary, depending upon the peculiar properties of the selected semiconductor and binder components, and to a great extent upon the method of making the coating. In embodiments in which a conductive coating is made by a solution coating method, minimum effective semiconductor concentrations in the finished coating may be as low as about 15% by volume. Useful conductive coatings according to my invention have surface resistivity less than $10^{11}$ ohms per square as measured by the procedure described in Example 1 of U.S. Patent 3,245,833. For most applications I prefer conductive coatings having surface resistivity in the range from about $10^2$ to $10^9$ ohms per square.

Cuprous iodide and silver iodide are preferred metal-containing semiconductor compounds that I have selected to illustrate certain preferred embodiments of the invention in detail. However, my invention contemplates use of other metal-containing semiconductor compounds. The invention contemplates use of both ionic and electronic semiconductor compounds of both intrinsic and extrinsic semiconductor types. Examples of other semiconductor compounds contemplated for use in accordance with the invention include other cuprous and silver halides, halides of bismuth, gold, indium, iridium, lead, nickel, palladium, rhenium, tin, tellurium and tungsten; cuprous, cupric and silver thiocyanates, and iodomercurates, and other metal-containing semiconductor compounds.

These semiconductor compounds are essentially non-hygroscopic and do not depend upon presence of moisture for their electrical conductivity.

The term "semiconductor" as used herein, defines metal-containing compounds having electrical resistivity (specific resistance) in the range from $10^{-3}$ to $10^9$ ohm-cm., as measured by standard procedures.

The term "surface resistivity" conventionally refers to measurement of electrical leakage across an insulating surface and is usually measured on an insulating surface by procedures similar to that described in Example 1 of U.S. Patent 3,245,833. In the present specification, however, the term is used with reference to resistance of conducting films that apparently behave as conductors transmitting currents through the body of the coating of electrically conducting material. Resistivity (specific resistance) is the usually accepted measurement for the conductive property of conducting and semiconducting materials. However, in the case of thin conductive coatings, measurement of the conductive property in terms of surface resistivity provides a value that is useful in practice and involves a direct method of measurement. It should be pointed out that the dimensional units for specific resistance (ohm-cm.) and the unit for surface resistivity (ohms per square) are not equivalent and the respective measurements should not be confused. For an electrically conducting material whose electrical behavior is ohmic, the calculated resistance per square of a film of such material would be the specific resistance of the material divided by the film thickness, but this calculated resistance for a given material will not always coincide with measured surface resistivity particularly in the case of a thin coated film.

In the above examples, we have described silver halide photosenstive and electron-beam-sensitive coatings and organic photoconductive insulating layers. My invention comprehends use of various other radiation-sensitive layers, for example, zinc oxide or other kinds of photoconductive insulating layers, X-ray senstive layers such as silver halide and the like. Electron-sensitive coatings such as silver halide, electron-sensitive monomers of the type described in U.S. Patent No. 2,748,288, patented May 29, 1956, and the like.

For making the dielectric moisture impermeable barrier layer, our most preferred class of resins consists of polymers and copolymers of vinylidene chloride including copolymers containing substantial amounts of vinylidene chloride with acrylic monomers such as acrylonitrile, methyl acrylate, and the like. However, other suitable resins for making the barrier layer are electrically insulating resins generally having good water-impermeability properties when coated as thin films, for example, resins of cellulose nitrate, polyvinyl butyral, polymethyl methacrylate, vinyl chloride, polystyrene, polyesters, polycarbonates, and the like.

In the above examples, we have illustrated advantages of the support comprising an electrically conductive layer overcoated with a water-impermeable electrically insulating barrier layer as supports for making direct electron recording films and for electrophotographic elements comprising a photoconductive insulating layer. Such supports can also be used for radiation-sensitive elements of various other kinds, for example, as a support with an antistatic backing for photographic films, particularly for cine films, as a support for X-ray films in which the combination of conducting layer, barrier layer, and radiation-sensitive layer is repeated on each side of a film support sheet, etc. Electrically conductive supports of the kind contemplated by the present invention will find wide use in a variety of photosensitive and other radiation-sensitive recording elements.

Instead of the support sheets of poly(ethylene terephthalate) film described in the examples, other film supports such as cellulose acetate, cellulose acetate butyrate paper, resin-coated papers, mineral-coated papers, glass, and the like may be used as supporting sheets for various elements embodying the present invention.

It will be understood that modifications and variations may be made within the scope of the invention as described above and as defined in the following claims.

I claim:

1. An electrically conductive support for radiation sensitive recording elements, comprising in combination a continuous supporting sheet of water impermeable film support, coated on said supporting sheet a discrete electrically conductive continuous layer having surface resistivity in the range from $10^{-2}$ to $10^{11}$ ohms per square and which comprises a semiconductor compound or a complex of a semiconductor compound dispersed in a film-forming resin vehicle, and coated over said electrically conductive layer a water impermeable dielectric resin film as a continuous barrier layer.

2. A radiation sensitive recording element comprising a radiation sensitive recording layer on an electrically conductive support defined in claim 1 said radiation sensitive layer being outward from said supporting sheet over said barrier layer.

3. An electrically conductive film support as defined in claim 1, said electrically conductive layer being a continuous film coated on said supporting sheet and said water impermeable layer being a continuous film coated over said electrically conductive layer.

4. An electrically conductive support as defined in claim 1, said electrically conductive layer consisting essentially of a film comprising cuprous iodide dispersed in a resin film-forming vehicle.

5. An electrically conductive support as defined in claim 1, said water-impermeable resin consisting essentially of a cellulose nitrate resin.

6. An electrically conductive support as defined in claim 1, said water-impermeable resin being a member selected from the group consisting of vinylidene chloride polymers and copolymers of vinylidene chloride with acrylic monomers.

7. A radiation-sensitve recording element comprising a radiation-sensitive silver halide layer on an electrically conductive support defined in claim 1.

8. A radiation-sensitive recording element comprising a continuous supporting sheet, a discrete electrically conductive continuous layer having surface resistivity in the range from $10^{-2}$ to $10^{11}$ ohms per square and which comprises a semiconductor compound or a complex of a semiconductor compound dispersed in a film-forming resin vehicle coated on said supporting sheet, a continuous barrier layer of water-impermeable resin coated over said conductive layer and a radiation sensitive silver halide image-forming layer over said barrier layer.

9. An electrically conductive support defined in claim 6 wherein said water-impermeable resin is a terpolymer of vinylidene chloride, methyl acrylate, and itaconic acid.

10. An electrically conductive support as defined in claim 6 wherein said water impermeable resin is a terpolymer of vinylidene chloride, acrylonitrile and acrylic acid.

11. A radiation-sensitive as defined in claim 7, said silver halide layer being outward from said supporting sheet over said water-impermeable layer.

12. A radiation-sensitive recording element comprising a continuous supporting sheet, a discrete electrically conductive continuous layer having surface resistivity in the range from $10^{-2}$ to $10^{11}$ ohms per square and which comprises a semiconductor compound or a complex of a semiconductor compound dispersed in a film-forming resin vehicle coated on said support sheet, a continuous barrier layer of water-impermeable resin coated over said conductive layer, and a photoconductive insulating recording layer over said barrier layer.

References Cited

UNITED STATES PATENTS

| | | | |
|---|---|---|---|
| 640,137 | 12/1899 | Kuhn | 96—85 |
| 1,471,592 | 10/1923 | Coberly | 96—87 |
| 2,463,282 | 3/1949 | Kang | 117—138.8 X |
| 2,555,321 | 6/1951 | Dalton et al. | 204—2 |
| 2,698,235 | 12/1954 | Swindells | 96—87 |
| 3,063,872 | 11/1962 | Boldebuck | 117—218 X |
| 3,135,608 | 6/1964 | Dickard | 96—85 X |
| 3,207,625 | 9/1965 | Stowell | 117—218 X |
| 3,245,833 | 4/1966 | Trevoy | 96—87 X |
| 3,253,922 | 5/1966 | Chu et al. | 96—85 |

NORMAN G. TORCHIN, *Primary Examiner.*

R. H. SMITH, *Assistant Examiner.*

U.S. Cl. X.R.

96—85, 87; 117—200, 218